United States Patent [19]

Itoh et al.

[11] Patent Number: 4,828,472
[45] Date of Patent: May 9, 1989

[54] APPARATUS FOR MOLDING AND SOLIDIFYING A RESINOUS COMPOSITE STRUCTURE

[75] Inventors: Yasuhiro Itoh, Seki; Katsuji Sakamoto, Gifu; Hideki Miyabe, Kagamigahara, all of Japan

[73] Assignee: Kawasaki Jukogyo Kabushiki Kaisha, Kobe, Japan

[21] Appl. No.: 545,640

[22] Filed: Dec. 16, 1983

[51] Int. Cl.$^4$ .............................................. B29C 43/12
[52] U.S. Cl. .................................... 425/143; 264/40.5; 264/40.6; 425/149; 425/405.1
[58] Field of Search ............... 425/405 H, 405 R, 445, 425/446, 29, 143, 149, 384, 144, 405.1, 405.2; 264/314, DIG. 50, 40.5, 40.6

[56] References Cited

U.S. PATENT DOCUMENTS

| | | | |
|---|---|---|---|
| 3,031,560 | 4/1962 | Snyder | 425/29 |
| 3,962,394 | 6/1976 | Hall | 264/313 |
| 4,326,844 | 4/1982 | Kissell | 425/384 |
| 4,455,268 | 6/1984 | Hinrichs et al. | 425/143 |

FOREIGN PATENT DOCUMENTS

58-62018   4/1983   Japan .................................. 425/143

Primary Examiner—Jan H Silbaugh
Assistant Examiner—Jill L. Heitbrink
Attorney, Agent, or Firm—Kerkam, Stowell, Kondracki & Clarke

[57] ABSTRACT

An apparatus for molding and curing a resin matrix composite material under pressure and heat by a use of a bag provided in an autoclave for covering the material and applying the pressure to the material. The apparatus comprises a plurality of heater elements arranged along surfaces of the structure to heat the same, a temperature control device for controlling the heating elements, a pressurizing device for adjusting the pressure difference across the bag to thereby pressurize the material, a pressure control device for controlling the pressurized device, temperature detectors for detecting temperatures at predetermined regions on the structures and generating electric signals representing temperatures at respective regions, pressure detectors for detecting pressures within the autoclave and the bag and generating electric signals representing the detected pressures, a regulating device for controlling the temperature control device and the pressure control device to heat and pressurize the structure in accordance with a predetermined condition when the regulating device receives the electric signals from the temperature control device and the pressure control device and for controlling the temperature control device to equalize the temperature at the regions on the material in heating and cooling steps.

7 Claims, 7 Drawing Sheets

APPARATUS FOR MOLDING AND SOLIDIFYING A RESINOUS COMPOSITE STRUCTURE

The present invention relates to an apparatus for molding and curing a so-called resin matrix composite structure including fibers impregnated with synthetic resin as a matrix material.

There is known an autoclave molding apparatus as an example of systems for molding and curing a resin matrix composite structure such as a fiber reinforced resin using glass fibers, organic fibers or carbon fibers. In such an autoclave molding apparatus, layers of the composite material are placed on a bag molding tool one above another and then covered with a so-called bag of a thin sheet of nylon or the like. Then, the interior of the bag is evacuated and the bag is inserted into the autoclave to be heated under pressure to mold and cure the composite material. In this type of autoclave molding apparatus, gas of raised temperature flows within the autoclave from the inlet to the opposite end to heat the composite material covered by the bag. In case where an elongated or large-sized structure is to be molded in the prior art autoclave molding apparatus, there will be a significant difference in temperature of the material to be molded between the gas inlet side and the gas outlet side due to a temperature gradient in the autoclave. Since it is difficult to have the temperature of the composite material quickly controlled by changing the gas temperature, it has been difficult to eliminate the aforementioned temperature difference in the composite material. As the results, a resin matrix composite material molded in the conventional autoclave has been likely to have uneven resin content throughout its length with the result that strength and modulus of elasticity become uneven.

The prior art autoclave molding apparatus is further disadvantageous in that it has been difficult to have the resin gelled substantially at the same time throughout the structure to be molded due to the uneven temperature increase in the material. This results in uneven curing shrinkage and thermal expansion. Further, there will also be an uneven temperature decrease so that an uneven thermal shrinkage will also be produced. These phenomenons may possibly produce cracks or deformations in the final product.

In the prior art autoclave molding apparatus, further, it is also difficult to predict when and how the resin will be fluidized so that it is very difficult to be molded eliminate voids which may be entrained in the structure at the laminating step and blisters which may be produced at the curing step. Further, it is also difficult to judge whether the structure is completely cured or not.

It is therefore an object of the present invention to provide an apparatus for molding and curing a resin matrix composite material in accordance with the autoclave molding process in which the temperature of the composite material can be uniformized throughout in heating and cooling the material to thereby accomplish uniform resin distribution.

Another object of the present invention is to provide a molding apparatus which can minimize any molding strain and prevent any cracking in the final product.

A further object of the present invention is to provide a molding apparatus which can produce an article of improved quality and reliability.

Still further object of the present invention is to provide an apparatus for molding and curing a resin matrix composite material carrying out an autoclave molding process in which voids, blisters and other defects can be eliminated and in which the resin can uniformly and completely be cured to produce articles of improved quality.

According to the present invention, the above and other objects can be accomplished by an apparatus for molding and curing a resin matrix composite material, said apparatus comprising autoclave means, bag mold means including bag means for covering the material to be molded, heating means including a plurality of heater elements for heating a plurality of regions on the material independently, pressurizing means for effecting an adjustment of relative pressure between interior of said autoclave means and interior of said bag means to apply a pressure to said material, temperature detection means for detecting temperatures at a predetermined number of points on said material and generating electric signals representing the temperatures at the detected points, pressure detection means for detecting pressures in said autoclave means and bag means and generating electric signals each indicative of detected pressure, temperature control means for controlling said heating means in accordance with the electric signals from said temperature detection means to uniformize temperatures at the regions of said material, and pressure control means for controlling said pressurizing means in accordance with the electric signals from said pressure detection means to apply a predetermined pressure to said material.

The molding and curing apparatus according to the present invention may further comprise resin property detection means for detecting resin properties such as initial fluidization, initiation of gelling and others at the predetermined number of regions on the material and generating electric signals each indicative of a detected resin property, and cycle regulating means for regulating temperature and pressure control cycles in said temperature and pressure control means in accordance with the electric signals from said resin property detection means.

In accordance with the molding and curing apparatus of the present invention, it is possible to avoid cracks and deformations in the molded material since the respective regions of the material can always be controlled to equalize the temperatures thereon by the heating means including a plurality of heater elements, the temperature detection means and the temperature control means. Further, any voids, blisters and other defects can be eliminated from the molded material since the pressurizing and heating cycles are controlled by means for detecting the resin property, that is, the time of initial fluidization in the material upon pressurizing and heating. In addition, the apparatus according to the present invention can completely and uniformly cure the resin so as to improve the molding quality.

The above and other objects and features of the present invention will become apparent from the following descriptions of preferred embodiments taking reference to the accompanying drawings, in which;

Figure 1:
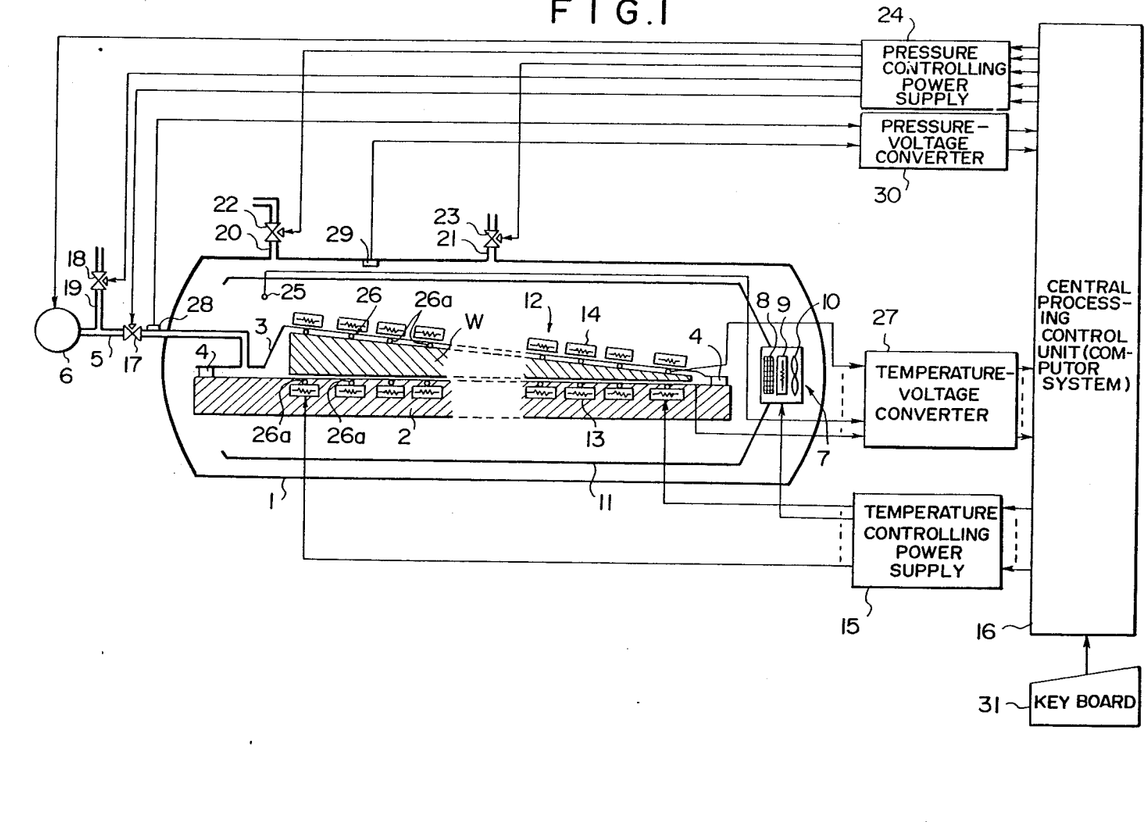
FIG. 1 is a schematic view showing the arrangement of an apparatus for molding and curing a resin matrix composite material in accordance with the first embodiment of the present invention.

Referring now the drawings, particularly to FIG. 1, there is shown a molding and curing apparatus 1 comprising a bag molding tool 2 on which pre-molding layers are placed one above another to form a structure W to be molded. The structure W is covered with a pressurizing bag of flexible film, that is, a vacuum bag 3. The vacuum bag 3 is held air-tightly by means of sealing members 4. The vacuum bag 3 is evacuated by a vacuum pump 6 through a pipe 5 to reduce the pressure therein so that the structure W be pressurized under a pressure difference between the interior of the autoclave 1 and the interior of the vacuum bag 3. The autoclave 1 is provided at the inside thereof with an internal temperature adjusting device 7 adapted to change the temperature of the interior of the autoclave 1. The internal temperature adjusting device 7 comprises a cooler 8, a heater 9 and a fan 10 and is adapted to regulate the temperature in the autoclave by producing air flow of a desired temperature in the autoclave. A rectifying and spacing wall 11 is further provided to rectify the air flow in the autoclave 1.

Figure 2:
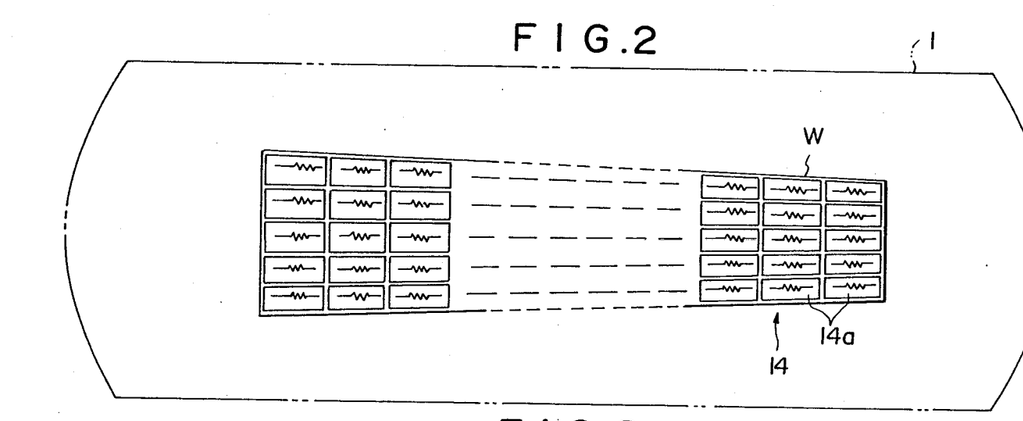
FIG. 2 is a plan view of the heater elements in the apparatus shown in FIG. 1.

For a direct heating of the structure W to be molded in the autoclave 1, a heating device 12 is provided adjacent the structure W in the autoclave 1. The heating device 12 comprises a multi-heater 13 embedded in the molding tool 2 and a multi-heater 14 embedded in, for example, a mat of heat-resistant rubber and placed over the structure W. As shown in FIG. 2, the multi-heater 14 includes a plurality of heater elements 14a covering the structure W substantially throughout the whole surface thereof. The multi-heater 13 is similar to the multi-heater 14 although the details thereof are not shown in the drawings. If the pressure required to mold an article is relatively low, it is desired that a multi-heater of infra-red radiating type is utilized in the present invention. Further, a multi-heat pipe may be used.

The internal temperature adjusting device 7 and heating device 12 are connected with a temperature controlling power supply 15 which is adapted to energize them. The power supply 15 is adapted to energize the individual one of the heater elements 13a, 14a independently under the control of a control device 16 which may be a microcomputer having an input/output interface.

The pipe 5 includes an automatic regulator valve 17 for communicating the inside of the bag 3 with the vacuum pump 6 and a branch 19 having an automatic valve 18 for venting the inside of the bag 3. On the other hand, the autoclave 1 includes intake and exhaust pipes 20 and 21 for introducing and exhausting pressurized gas into and from the autoclave 1. The pipes 20 and 21 include automatic intake and exhaust valves 22 and 23, respectively. The vacuum pump 6 and automatic valves 17, 18, 22 and 23 are connected electrically to a pressure controlling power supply 24 which is adapted to energize them. The power supply 24 is controlled by the above control device 16 to energize these components.

Adjacent to the inlet of the autoclave 1 there is located an internal temperature detecting device 25 for detecting the temperature within the autoclave 1. In order to detect temperatures at the respective regions of the structure W, there is further provided a material temperature detecting device 26 close to the structure W. The temperature detecting device 26 includes a plurality of senser elements 26a each of which consists of IC (iron constantan) or CA (chromel-alumel) thermocouple and is located at a position corresponding to the respective one of the heater elements 13a and 14a. The senser elements 26a may be in the form of a film gauge type temperature detector if the surface of the structure W must particularly be improved in quality. In this case, it is desirable to use foil-like lead wires. Any senser element 26a positioned below the structure W may be embedded in the molding tool 2 as shown. The detectors 25 and 26 are electrically connected with a temperature-to-voltage converter 27 which converts temperatures into sufficiently large electric signals which are in turn supplied to the control device 16.

On the other hand, a vacuum system pressure detector 28 for detecting pressures in the vacuum system between the vacuum pump 6 and the bag 3 is provided in the pipe 5. An internal pressure detector 29 for detecting pressures in the autoclave 1 is located on the autoclave 1. These pressure detectors 28 and 29 are electrically connected to a pressure-to-voltage converter 30 which is adapted to convert pressures into sufficiently large electric signals which are in turn supplied to the control device 16.

The control device 16 is comprised of a microcomputer having a multi-channeled input/output interface, and a key input device 31 for voluntarily inputting heating temperature data which includes data relating to molding pressure controlling cycles, a heat-up rate or rate of increase in temperature, temperature on curing, time required for curing, temperature on reducing pressure and others. The control device 16 is adapted to suitably control the pressurizing and heating cycles on the structure W in accordance with the above cycle data, to perform the calculation and judgment in accordance with the input electric signals for causing the temperature controlling power supply 15 and the pressure controlling power supply 24 to control the pressure within the autoclave 1, and to control the heater elements 13a and 14a so that temperatures at the respective regions of the structure W follow a predetermined temperature in the autoclave 1.

With reference to a flow chart in FIG. 3, the operation of the molding and curing apparatus according to the present invention will now be described in detail, particularly in connection with the function of the control device 16.

First of all, the structure W which is a premolded article is placed on the molding tool 2. The temperature detector 26 is then placed on the structure W. This assembly is then sealingly covered by the bag 3. While maintaining this state, the molding tool 2 is inserted into the autoclave 1. Subsequently, the valve 18 is closed, and the vacuum pump 6 is activated (step A). The autoclave 1 is then closed, and the valves 17 and 23 are opened (step B). After a predetermined time period, the vacuum system pressure detector 28 generates an output which is used to discriminate whether or not the degree of vacuum in the vacuum system, that is, the bag 3 is sufficient (step C). If this discrimination is NO, any leakage of vacuum will be warned from the control device 16. For this purpose, it is desirable to locate a warning device (not shown) in the control device 16. On the contrary, if the discrimination is YES, the valve 22 is opened to increase the pressure within the autoclave 1 up to a predetermined value (step D). It is generally desirable that the rate of increase in pressure is increased depending upon the pressurizing ability of the apparatus. The predetermined pressure stated hereinbefore is a constant pressure which is determined depending on the resin material of the structure and the kind of the structure itself, and for example is generally a few $Kg/cm^2$.

When the pressure in the autoclave is increased to one $Kg/cm^2$ (step E), the valve 18 is opened and then the vacuum pump 6 is de-energized. During this procedure, pressurized gas is being introduced into the autoclave 1 to increase the internal pressure thereof (step G). When the pressure detector 29 detects that the internal pressure in the autoclave has reached said predetermined pressure (step H), the temperature controlling power supply 15 becomes active to cause the internal temperature adjusting device 7 and the heating device 12 to initiate the heating of the structure W (step I). Thereafter, the heater elements 13a and 14a in the heating device 12 are controlled while detecting temperatures at the respective regions on the structure W by the use of the temperature detector 26, whereby the temperatures at the regions of the structure W are respectively increased up to the same temperature as a predetermined internal temperature in the autoclave 1 while at the same time the increased temperatures of the structure regions are maintained through a predetermined period of curing (step J). The increment of pressure due to any expansion of pressuring gas associated with the increase of temperature based on heating and the decrement of pressure due to any leakage of gas are corrected by opening or closing the valves 22 and 23 to maintain the pressure in the autoclave 1 at a predetermined molding pressure (step K). This control is continued till the subsequent pressure reducing step is started.

In such a state, the structure W is molded and cured. After a sufficient period of curing (step L), the cooler 8 is activated to cool the structure W at the maximum rate at which the temperatures at the respective regions of the structure W will uniformly be reduced (step M). At this cooling step, the cooler 8 and heater elements 13a, 14a are controlled depending upon the rate of temperature decrease in the thick-walled portion of the structure in which its thermal capacity is large. When the temperature in the structure W reaches a predetermined temperature of pressure reduction (step N), the valve 22 is closed and the valve 24 is opened to exhaust the autoclave for reducing the pressure therein (step P). The temperature of pressure reduction described above is one which is determined depending on the resin material of the structure W and the kind of the structure itself. It is substantially room temperature or several tens °C to room temperature. After the pressure reducing step, the autoclave 1 is opened (step Q) for removing the molded and solidified structure W. Then, the cycle is terminated.

Figure 3:
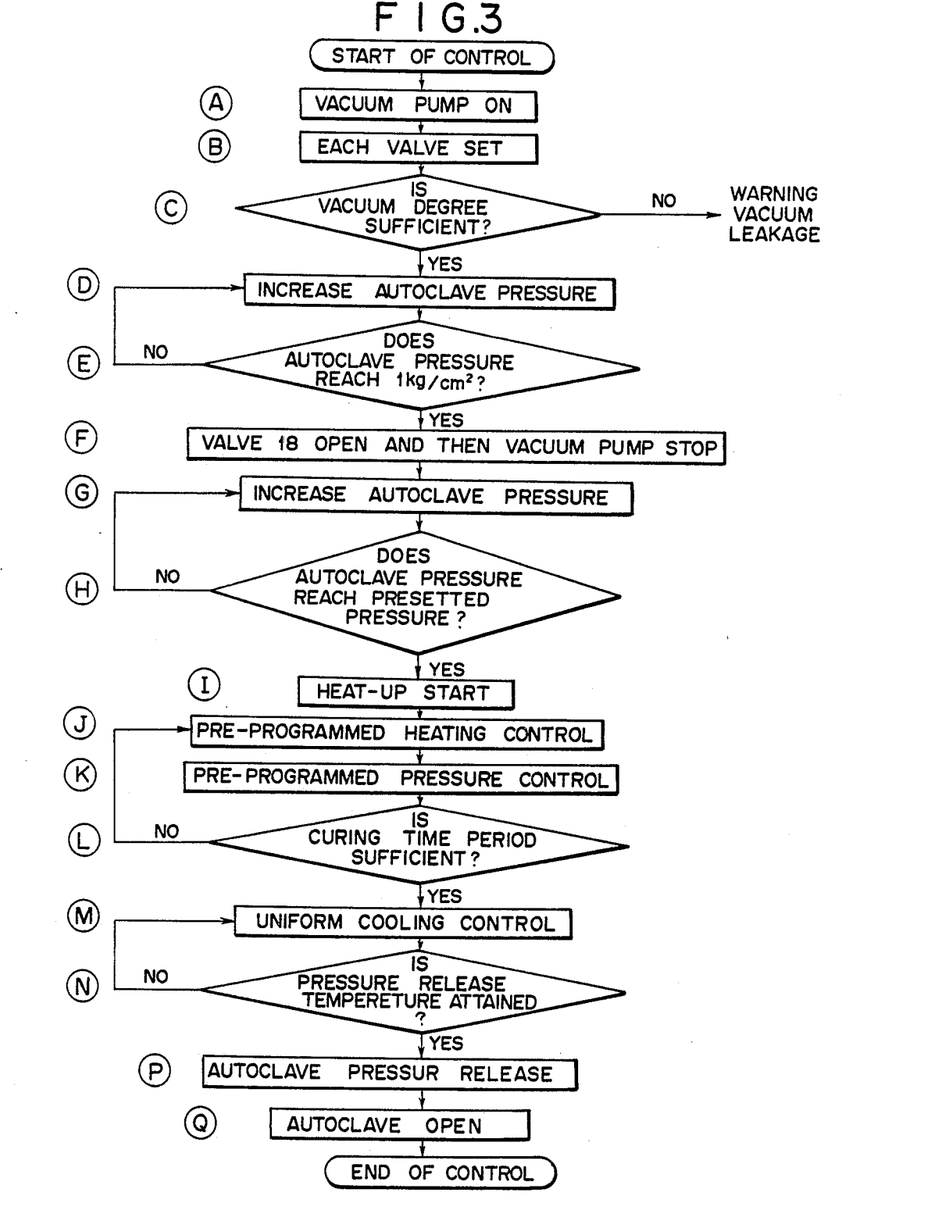
FIG. 3 is a flow chart illustrating the operation of the apparatus of the first embodiment.
Figure 4:
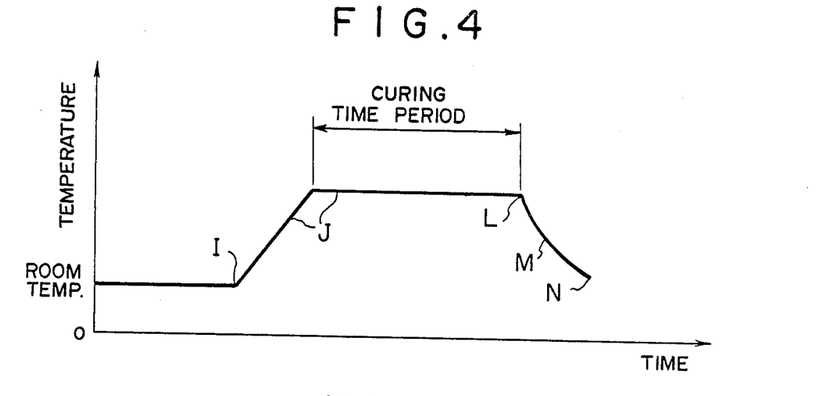
FIG. 4 is a view showing the heating control cycle in the apparatus of the first embodiment.
Figure 5:
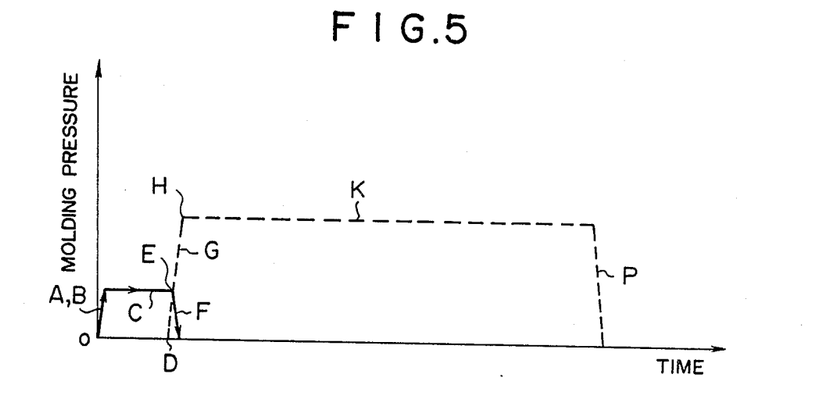
FIG. 5 is a view showing the pressurizing control cycle in the apparatus of the first embodiment.

The heat and pressure controlling cycles carried out under the above control are shown in FIGS. 4 and 5. In these figures, alphabetic symbols correspond to the symbols used in the flow chart of FIG. 3.

In the conventional process, the article to be molded has been heated only by the heat of the gas in the autoclave, however, it should be noted that the above apparatus of the present invention detects temperatures at the respective regions of the structure and accurately controls temperatures on the respective regions of the molding by the use of the microcomputer and multi-heater system, resulting in many advantages which will be described below.

In the whole curing cycle from the heating-up of the article to be molded through the maintenance of the predetermined curing temperature to the cooling and pressure reducing steps, the temperatures at the regions of the molding are uniformly controlled to equalize the fluidization and curing reaction of the resin and also to equalize the amount of resin contained in the respective regions of the structure, whereby the strength of the structure becomes even.

Since the distribution of temperature throughout the structure is uniform until the temperature thereof becomes room temperature, the thermal expansion and thermal shrinkage are uniformly produced. Therefore only a very slight deformation is produced due to the setting shrinkage of the resin so that it is possible to present any cracks.

Figure 6:
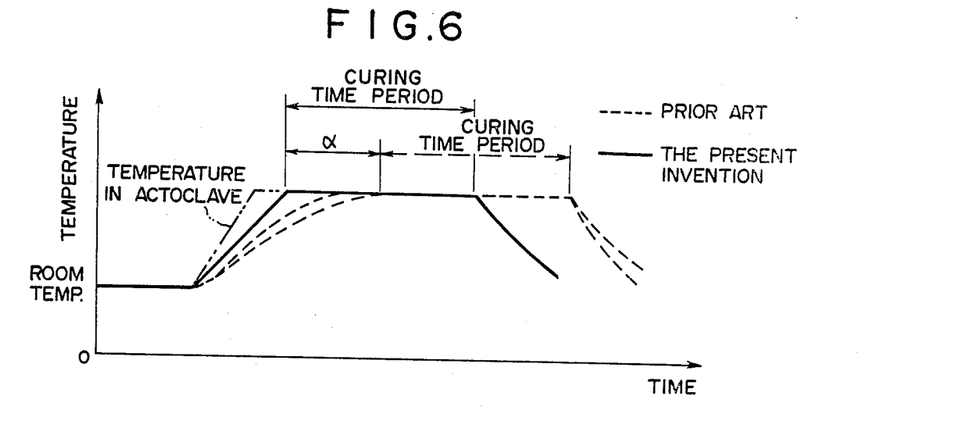
FIG. 6 is a view illustrating the advantage in the apparatus of the first embodiment.

In the conventional process, the thermal capacity of the article to be molded reduces the heating-up rate as the temperature approaches the predetermined curing temperature as seen by a flat top on a curve of curing temperature cycle at the heating-up step, as shown by broken line in FIG. 6. There is therefore "time loss due to a delay of temperature increase" shown by α in FIG. 6. In the apparatus of the present invention, however, the temperatures at the respective regions of the article to be molded can be coincided with a predetermined curve of solidifying temperature cycle so that such a time loss at the molding process can be eliminated. In addition, the same function causes the temperatures at the respective regions of the molding to coincide with any internal temperature in the autoclave so that the heating-up rate itself can be increased to further save the time required in molding.

An apparatus in accordance with a second embodiment of the present invention will now be described with reference to FIGS. 7 to 13.

Figure 7:
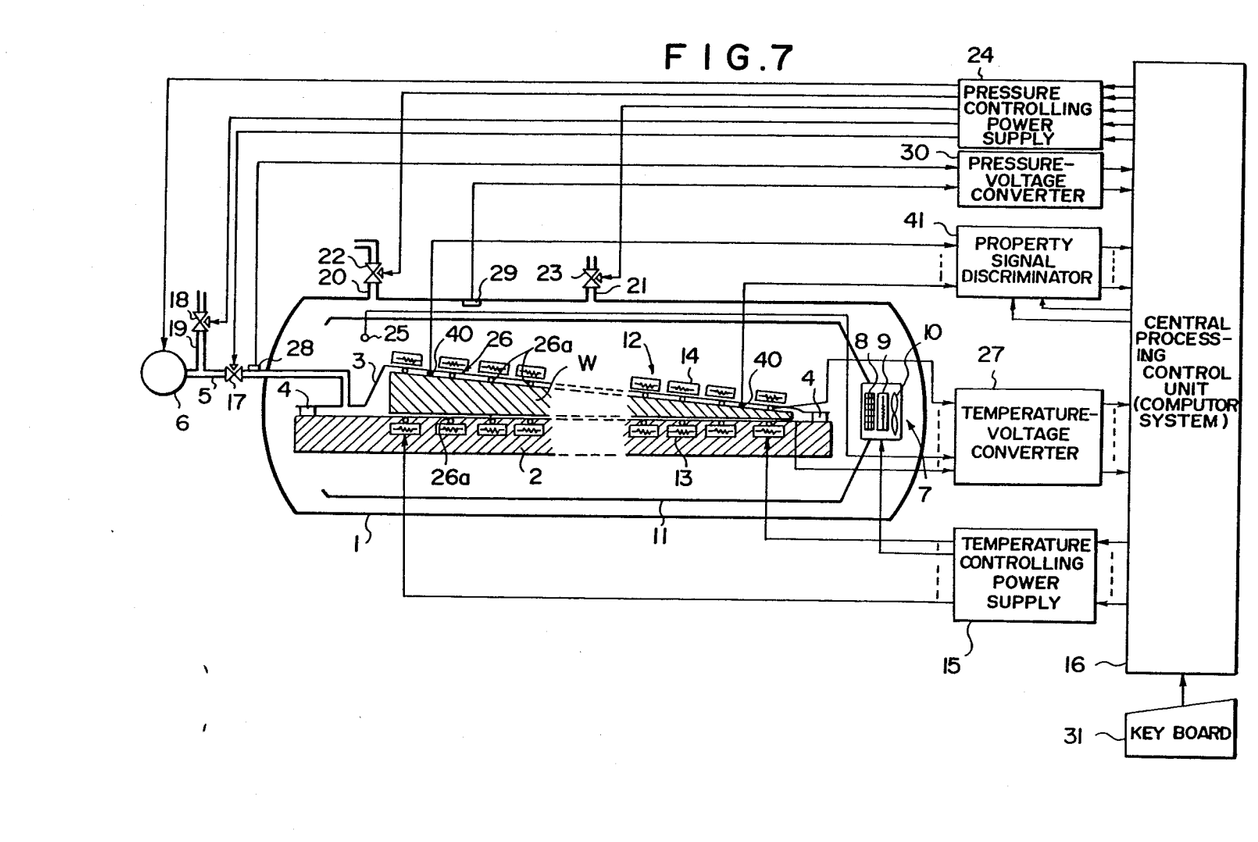
FIG. 7 is a schematic view showing the arrangement of an apparatus for molding and curing a resin matrix composite material in accordance with the second embodiment of the present invention.

The apparatus illustrated has such a function that start of fluidization and start of gelling in the resin of the structure W are judged at the heating step to obtain data with respect to the resin properties, which data is used to automatically regulate the above-mentioned heating and pressurizing control cycles in a more desirable direction. For this end, the molding and curing apparatus in the second embodiment comprises resin property detecting devices 40 in addition to the components of the molding and curing apparatus in accordance with the first embodiment of the present invention. In the second embodiment, the same components, members and devices as in the first embodiment are denoted by the same symboles and will not further be described.

Figure 8:
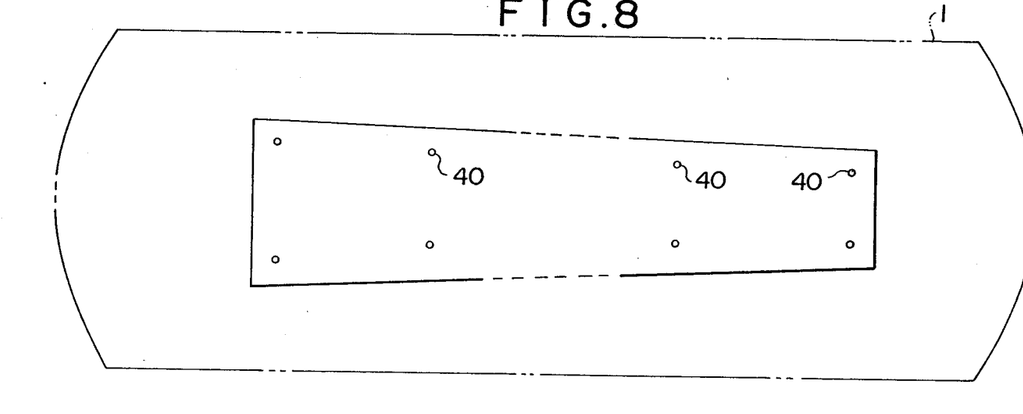
FIG. 8 is a plan view showing the resin property detectors used in the apparatus of FIG. 7.

Each of the resin property detecting devices 40 includes a pair of thin electrode plates applied to the surface of the structure W or a set of two or three electrode wires applied to the surface of the structure or inserted into the interior of the structure. Although the electrode plate pair and wires may be used singly or in combination, it is general to use the electrode plates in pairs on the thin-walled portions of the structure while the electrode wires are used to detect the internal condition of the structure at the thick-walled portions. The detectors 40 are arranged on a region of the structure where the temperature of the structure may be most slowly increased, a region of the structure where the temperature of the structure may be most rapidly increased, and several intermediate regions of the structure. For example, the detectors 40 are disposed on the structure as shown in FIG. 8. If the structure W includes any electrically conductive material such as carbon fibers or the like, it is required that the electrodes of the detectors be covered with a porous insulating covering such as cotton cloth, synthetic fiber cloth or the like such that the electrodes will contact only with the resin but not with the conductive fibers. Thus, when the viscosity in the resin is reduced under heat, the resin will penetrate into the insulating membranes to contact with the electrodes. All the electrodes and their leads are in the form of a thin electrode plate or wire such that they do not provide any harmful influence on the structure to be molded. It is practically preferred that each of the electrodes or wires is made of a material of 0.1 mm thickness or 0.1 mm diameter.

The resin property detectors 40 serve to detect the change in resin properties by detecting the change in D.C. potential or electric resistance which is produced at the beginning of the curing process of the resin in the structure W. The detectors 40 are connected to a property signal discriminator 41 which when it receives property signals from the detectors 40, processes such signals to supply them to the microcomputer of the control device 16. When receiving the property signals, the control device 16 serves to correct the predetermined heating and pressurizing cycles aforementioned in accordance with the signals.

Figure 9:
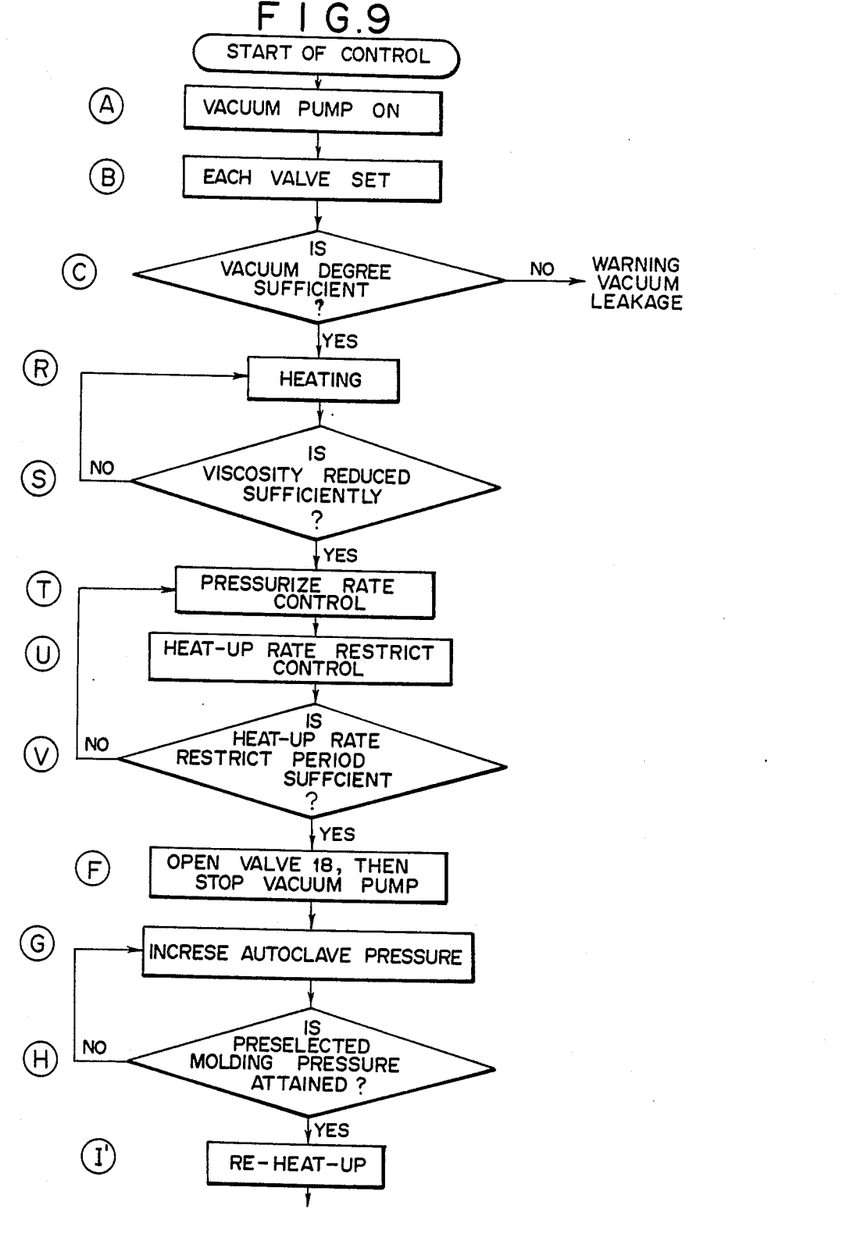
FIG. 9 is a flow chart illustrating the major portions of operation in the apparatus of the second embodiment.

The operation of the molding and curing apparatus which is the second embodiment of the present invention includes new steps R–V shown in FIG. 9 which are used in place of the steps D and E in the flow chart shown in FIG. 3. Therefore, only the steps R–V will be described herein.

Figure 10:
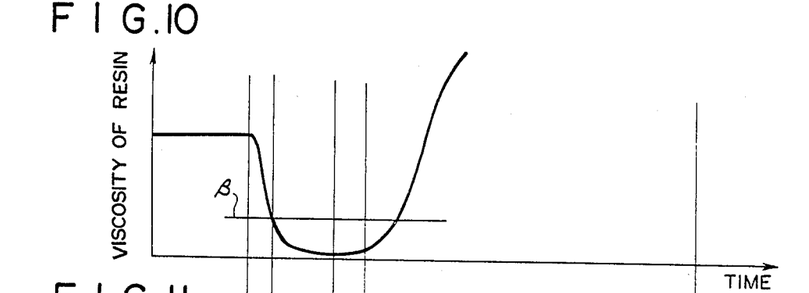
FIG. 10 is a view showing the change in viscosity with respect to a certain resin material.
Figure 11:
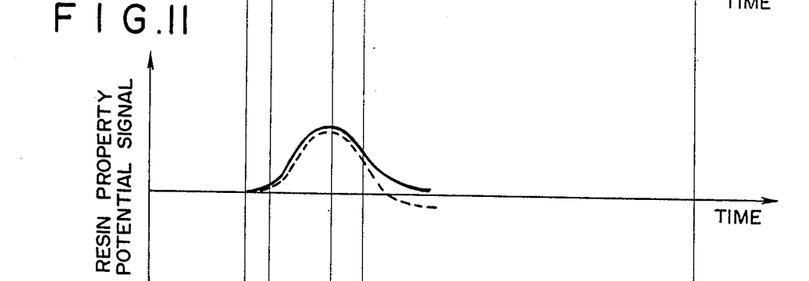
FIG. 11 is a view showing an example of the changes in resin property potential signals which generate at the outputs of resin property detectors when the viscosity of the resin is varied as shown in FIG. 10.

When the degree of vacuum in the bag 3 becomes sufficient, the temperature controlling power supply is activated to cause the internal temperature adjusting device 7 and the heating device 12 to heat the structure W (step R). This heating is effected while controlling the heater elements 13a and 14a in association with the temperature increase of a region of the structure W which is slowest in the heating-up rate. For example, if the viscosity in the resin of the structure W is varied by the heating operation as shown in FIG. 10 and when the resin property potential signal from the resin property detectors 40 is varied as shown in FIG. 11, it is judged from this potential signal whether or not the viscosity of resin is lowered sufficiently to remove any void and blister as shown by $\beta$ in FIG. 10 (step S). This viscosity is generally several tens centipoises or less. After the viscosity of the resin has been sufficiently reduced, the temperature and pressure in the autoclave and those of the structure W are controlled at the optimum state for deaeration of the resin (steps T and U) to remove the gaseous component sufficiently from the interior of the structure W. This sufficient elimination of gaseous component is carried out by the judgment of sufficient time period required to suppress the increase of temperature. This judgment of sufficient time period required to suppress the increase of temperature is effected when the electric signal reaches its maximum value, when the increase of temperature begins to decrease or when a pre-selected maximum time period has elapsed. After the gaseous component in the structure W has been completely removed, the normal molding and curing step is carried out.

Figure 12:
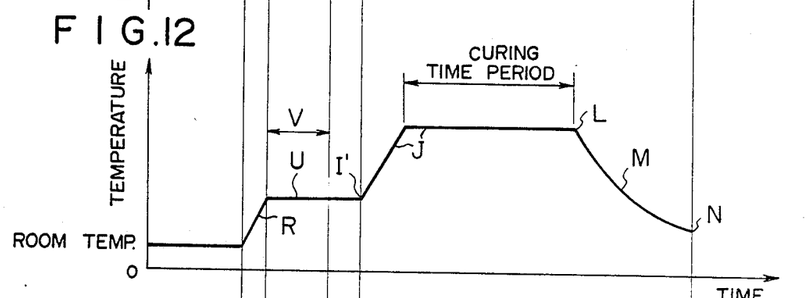
FIG. 12 is a view showing the heating control cycle in the apparatus of the second embodiment.
Figure 13:
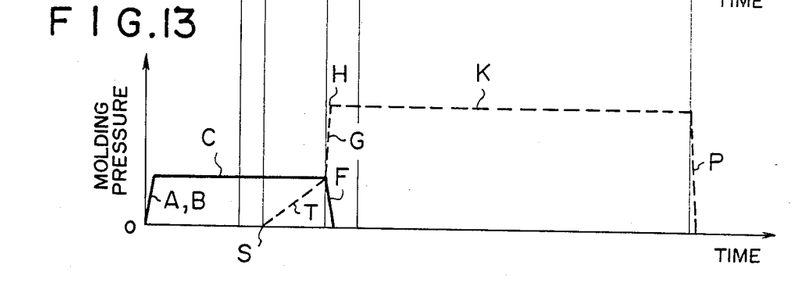
FIG. 13 is a view showing the pressurizing control cycle in the apparatus of the second embodiment.

The heating and pressurizing control cycles effected under the above control are shown in FIGS. 12 and 13, respectively. In these figures, alphabetic symbols correspond to those of the flow chart shown in FIG. 9.

In addition to the controlling functions by the multi-heater and others under the control of the microcomputer in the first embodiment of the present invention, the apparatus of the second embodiment has a function for precisely controlling the molding temperature cycle and pressurizing cycle by electrically detecting the properties of the resin in the molded article such that the deaeration of gaseous component in a structure to be molded can positively be attained by suppressing the increase of temperature under heat and controlling the pressure at the resin fluidizing step before gelling. Therefore, it is possible to eliminate any voids in the structure produced in laminating the materials, any blisters created by volatile components which have been produced on the curing reaction, any gaseous component remaining between the resin and the fibers. Accordingly, the strength can uniformly be maintained throughout the structure at its maximum value to provide a molded article without any defect. Since the conditions of heating and pressurizing can accurately be controlled depending on the properties of the resin, an optimum molding and curing cycle can be provided for each of various different resin materials. Thus, molded articles can always be obtained with their best qualities by carrying out molding operations dependent upon the kind of resins and the irregularity of quality in materials to be molded.

The invention has thus been shown and described with reference to specific embodiments, however, it should be noted that the invention is in no way limited to the details of the illustrated arrangements but changes and modifications may be made without departing from the appended claims.

We claim:

1. An apparatus for molding and curing a resin matrix composite material under pressure and heat by a use of bag means provided in an autoclave for covering the material and applying the pressure to said material, said apparatus comprising heating means including a plurality of heating elements arranged along surface of said material to heat the same, temperature control means for independently controlling said heating elements, pressurizing means adjusting pressure difference across said bag means to thereby pressurize said material, pressure control means for controlling said pressurizing means, temperature detection means including temperature sensing elements for detecting temperatures at regions on said materials which are heated by respective ones of said heating elements and generating electric signals representing temperatures at respective regions, pressure detection means for detecting pressures within said autoclave and said bag means and generating electric signals representing the detected pressures, regulating means for controlling said temperature control means and said pressure control means to heat and pressurize said material in accordance with a predetermined condition when said regulating means receives the electric signals from said temperature detection means and said pressure detection means and for controlling said temperature control means to equalize the temperatures at the regions on said material in at least one of heating and cooling steps.

2. An apparatus in accordance with claim 1 which includes molding tool means for placing the resin matrix composite material thereon, said bag means being placed over the structure laid on said tool means, at least a part of said heating elements being located in said tool means.

3. An apparatus in accordance with claim 2 in which said temperature detection means is provided in said tool means.

4. An apparatus in accordance with claim 2 in which said heating elements are provided along the bag means at a side opposite to the resin matrix composite material.

5. An apparatus in accordance with claim 4 in which said temperature detection means is provided along said bag means at a side facing to said resin composite material.

6. An apparatus for molding and curing a resin matrix composite material under pressure and heat by a use of bag means provided in an autoclave for covering the material and applying the pressure to said material, said apparatus comprising heating means including a plurality of heating elements arranged along surfaces of said structure to heat the same, temperature control means for independently controlling said heating elements, pressurizing means for adjusting pressure difference across said bag means to thereby pressurize said material, pressure control means for controlling said pressurizing means, temperature detection means including temperature sensing elements for detecting temperatures at regions on said material which are heated by respective ones of said heating elements and generating electric signals representing temperatures at respective regions, pressure detection means for detecting pressures within said autoclave and said bag means and generating electric signals representing the detected pressures, resin property detection means for detecting at least one of resin properties at predetermined regions on said material and generating an electric signal representing the detected resin property, regulating means for controlling said temperature control means and said pressure control means to heat and pressurize said material in accordance with a predetermined condition when said regulating means receives the electric signals from said temperature detection means, said pressure detection means and said resin property detection means and for controlling said temperature control means to equalize the temperatures at the regions on said material at least upon heating or cooling.

7. An apparatus in accordance with claim 6 in which said resin property detection means includes a plurality pairs of electrodes.

* * * * *

UNITED STATES PATENT AND TRADEMARK OFFICE
CERTIFICATE OF CORRECTION

PATENT NO. : 4,828,472

DATED : May 9, 1989

INVENTOR(S) : ITOH et al

It is certified that error appears in the above-identified patent and that said Letters Patent is hereby corrected as shown below:

In Col. 8, line 59, "surface" should be --surfaces--.

Signed and Sealed this

Sixteenth Day of October, 1990

Attest:

HARRY F. MANBECK, JR.

*Attesting Officer*    *Commissioner of Patents and Trademarks*